(12) United States Patent
Bahl et al.

(10) Patent No.: US 7,539,508 B2
(45) Date of Patent: May 26, 2009

(54) REDUCING IDLE POWER CONSUMPTION IN A NETWORKED BATTERY OPERATED DEVICE

(75) Inventors: Paramvir Bahl, Sammamish, WA (US); Eugene Shih, Seattle, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/376,388

(22) Filed: Mar. 15, 2006

(65) Prior Publication Data

US 2006/0160559 A1 Jul. 20, 2006

Related U.S. Application Data

(62) Division of application No. 10/124,737, filed on Apr. 17, 2002, now Pat. No. 7,230,933.

(51) Int. Cl.
*H04B 7/00* (2006.01)
(52) U.S. Cl. .................. 455/522; 455/13.4; 455/127.1; 455/343.1; 455/556.1; 455/574; 370/338; 713/320
(58) Field of Classification Search ................ 455/522, 455/13.4, 426.1, 343.1, 434, 552.1, 553.1, 455/556.1, 574, 127.1–127.5, 434.6, 143.6; 340/539.19, 572.1; 370/338, 311, 346; 713/300, 713/320
See application file for complete search history.

(56) References Cited

U.S. PATENT DOCUMENTS

| | | | |
|---|---|---|---|
| 5,410,738 A | 4/1995 | Diepstraten et al. | |
| 5,740,363 A | 4/1998 | Siep et al. | |
| 5,790,536 A | 8/1998 | Mahany et al. | |
| 5,844,893 A | 12/1998 | Gollnick et al. | |
| 5,850,181 A | 12/1998 | Heinrich et al. | |
| 5,898,904 A * | 4/1999 | Wang ......................... 340/7.27 |
| 5,949,776 A | 9/1999 | Mahany et al. | |
| 5,960,344 A | 9/1999 | Mahany | |
| 6,278,883 B1 * | 8/2001 | Choi ........................ 455/552.1 |
| 6,711,418 B1 * | 3/2004 | Wang et al. .............. 455/553.1 |
| 6,807,165 B2 | 10/2004 | Belcea | |
| 2001/0055275 A1 | 12/2001 | Herrmann et al. | |
| 2003/0198196 A1 | 10/2003 | Bahl et al. | |
| 2003/0203740 A1 | 10/2003 | Bahl et al. | |

(Continued)

*Primary Examiner*—Matthew D Anderson
*Assistant Examiner*—Shaima Q Aminzay
(74) *Attorney, Agent, or Firm*—Wolf, Greenfield & Sacks, P.C.

(57) ABSTRACT

An improved method and system for reducing the power consumption of computing devices capable of communicating over a wireless network allows longer device operation and/or the use of smaller batteries. The wireless computing device supports a low power channel for receiving control signals during idle periods of operation. When the computing device is idle, the device is configured to power down all of its components with the exception of the circuitry required to power the low power channel. As such, the channel is maintained in an active state for receiving signals during both idle and non-idle periods, or in an embodiment, only during idle periods. When another device wishes to communicate with the wireless computing device, the low power channel passes a "wake-up" signal to the device indicating that the device be powered up from the idle mode of operation. A host RF component that is coupled to the network via a host computer generates this wake-up signal in an embodiment of the invention.

13 Claims, 9 Drawing Sheets

U.S. PATENT DOCUMENTS

2004/0179469 A1 9/2004 Attar et al.
2004/0181569 A1 9/2004 Attar et al.
2004/0259605 A1* 12/2004 Quigley et al. .............. 455/574
2005/0059347 A1 3/2005 Haartsen

* cited by examiner

REDUCING IDLE POWER CONSUMPTION IN A NETWORKED BATTERY OPERATED DEVICE

RELATED APPLICATION

This application is a division of application Ser. No. 10/124,737 entitled REDUCING IDLE POWER CONSUMPTION IN A NETWORKED BATTERY OPERATED DEVICE, filed on Apr. 17, 2002 now U.S. Pat. No. 7,230,933.

TECHNICAL FIELD OF THE INVENTION

The present invention relates generally to wireless computing devices, and more particularly to power management in wireless computing devices having batteries for power sources.

BACKGROUND

Wireless computing devices, such as laptop computers, personal digital assistant devices, etc., that communicate with other devices through wireless signals are becoming increasingly popular. Wireless computing devices are typically battery-powered. Since the amount of power a battery can provide is rather limited, minimizing the power consumption of a device in order to extend its operation time is an important consideration in the design of battery operated wireless devices.

A particular component of a wireless device that consumes a significant amount of power is the network interface card (NIC), which handles the wireless transmission and reception of network communication data. It has been estimated that on average, about 20% of the total power available to a wireless device is dissipated as a result of the connection of a NIC, or other wireless LAN interface component. This phenomenon is due to the fact that the NIC and wireless device must be in a constant "listening" state in order to receive and transmit data via the network. As a result, battery power is used to power the device and the NIC even when no message is being sent or transmitted.

To overcome this challenge, various schemes for reducing the battery consumption in wireless devices have been developed and implemented within conventional wireless devices. One such power management scheme involves completely powering off the NIC of the device during periods in which no data communication is occurring for that device. While this mode of operation aids in reducing the power consumption of the device, it can hinder reconnection of the relevant device to the network when needed.

Another power management scheme often employed by wireless devices entails switching the NIC between different power states having different power consumption levels. Those states include high-power states, in which the NIC is powered up to enable the transmission of network communication data, and low-power states in which the network interface card is put in a sleep mode. Similar to the above-described scenario in which the NIC is powered off, when the NIC is in a low-power state, data transmissions can be significantly delayed while the NIC attempts to reconfigure with the network. Resultantly, the delayed data has to be temporarily stored in a queue until the NIC is switched back to the high-power state where it is ready for data communication. A significant amount of delayed network traffic data may be accumulated in the transmission queue if the interface network card is kept in the low-power state too often, or for too long.

SUMMARY

To address the challenges described above, a method and system are disclosed for reducing the battery consumption of computing devices capable of communicating over a wireless network. Such wireless computing devices include, but are not limited to, personal data assistants, cellular phones, and laptop computers having wireless network interface capabilities.

In accordance with an embodiment of the invention, a wireless computing device enables a low power control channel to interpret signals for controlling the power usage of a network interface card (NIC), and other power consuming components of the computing device during idle periods. Idle periods are periods of low power operation for the computing device, or when no network activity (e.g., sending or receiving of data) is being engaged in by the wireless computing device via its high frequency communication channel (e.g., 802.11 based channel). The low power control channel is implemented via an internal or external radio frequency (RF) transceiver component, referred to as a minibrick, which preferably operates at a low frequency level. In operation, when the computing device is idle or in a low power state, the device is configured to power down all of its components with the exception of the circuitry required to power the low power transceiver component. As such, the control channel is maintained in an active state for receiving signals during both idle and non-idle periods. When another device wishes to communicate with the wireless computing device, the low power control channel receives a "wake-up" signal indicating that the NIC and other components of the computing device are to be powered up. This wake-up signal is received from another transceiver component, referred to as a smartbrick or host transceiver.

In accordance with another embodiment of the invention, the host transceiver operates upon a host computer to communicate with the low power transceiver operating upon the wireless computing device. Alternatively, the host transceiver operates at a device acting as a wireless access point—an intermediate device that acts as an interface between a server that manages and facilitates data communication over the network, and the wireless device. In the former case, the host computer is equipped with a low power NIC for supporting wireless communication with the wireless device, and accesses the network via the access point (AP). When a requesting device wishes to communicate with the wireless computing device, it first queries the server (e.g., submits a subscription request) in order to determine the presence of the wireless computing device. In response, the server locates the path to the wireless device via a host computer operating a low power NIC, and notifies the requesting device of its presence. Once the presence of the wireless computing device is known, the requesting device sends a wakeup request to the server, and notifies the host computer. Next, the host transceiver operating upon the host computer submits a low power wakeup signal to the low power transceiver at the wireless device to prompt it to power up the device. In response, the wireless computing device powers up the high power, or standard NIC and other components accordingly, resulting in activation of the wireless device prior to any actual transmission of data by the requesting device.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention and its advantages may be best understood from the following detailed description taken in conjunction with the accompanying drawings, of which:

DETAILED DESCRIPTION OF PREFERRED EMBODIMENTS

A method and system are described for reducing the battery consumption of computing devices that are capable of communicating over a wireless network. Wireless computing devices usable within embodiments of the invention include, but are not limited to, personal data assistants, cellular phones, and laptop computers having wireless network interface capabilities. In the context of the invention, wireless communication is the transmission of data between computing devices using radio frequency electromagnetic waves rather than wires. To facilitate wireless communication, a computing device may be equipped with a network interface card (NIC) that interfaces the device to the network. Typically, the NIC is implemented as a plug and play component that can be inserted into a network interface (e.g., card slot) of the computing device. Alternatively, the NIC can be built integrally as part of the circuitry of the wireless computing device.

To facilitate wireless communication, the NIC supports a wireless protocol, such as pursuant to the IEEE 802.11 standard. General reference will be made throughout the course of this description to 802.11 as a suitable protocol for facilitating wireless communication between devices. However, those skilled in the art will recognize that 802.11 is only one protocol for facilitating wireless communication, and that the invention is not limited to any one wireless protocol. Indeed, other wireless protocols may be utilized alternatively or additionally in connection with the invention. It will also be recognized by those skilled in the art that 802.11 refers to other protocols within the same family, including 802.11a, 802.11b or 802.11g.

Figure 1:
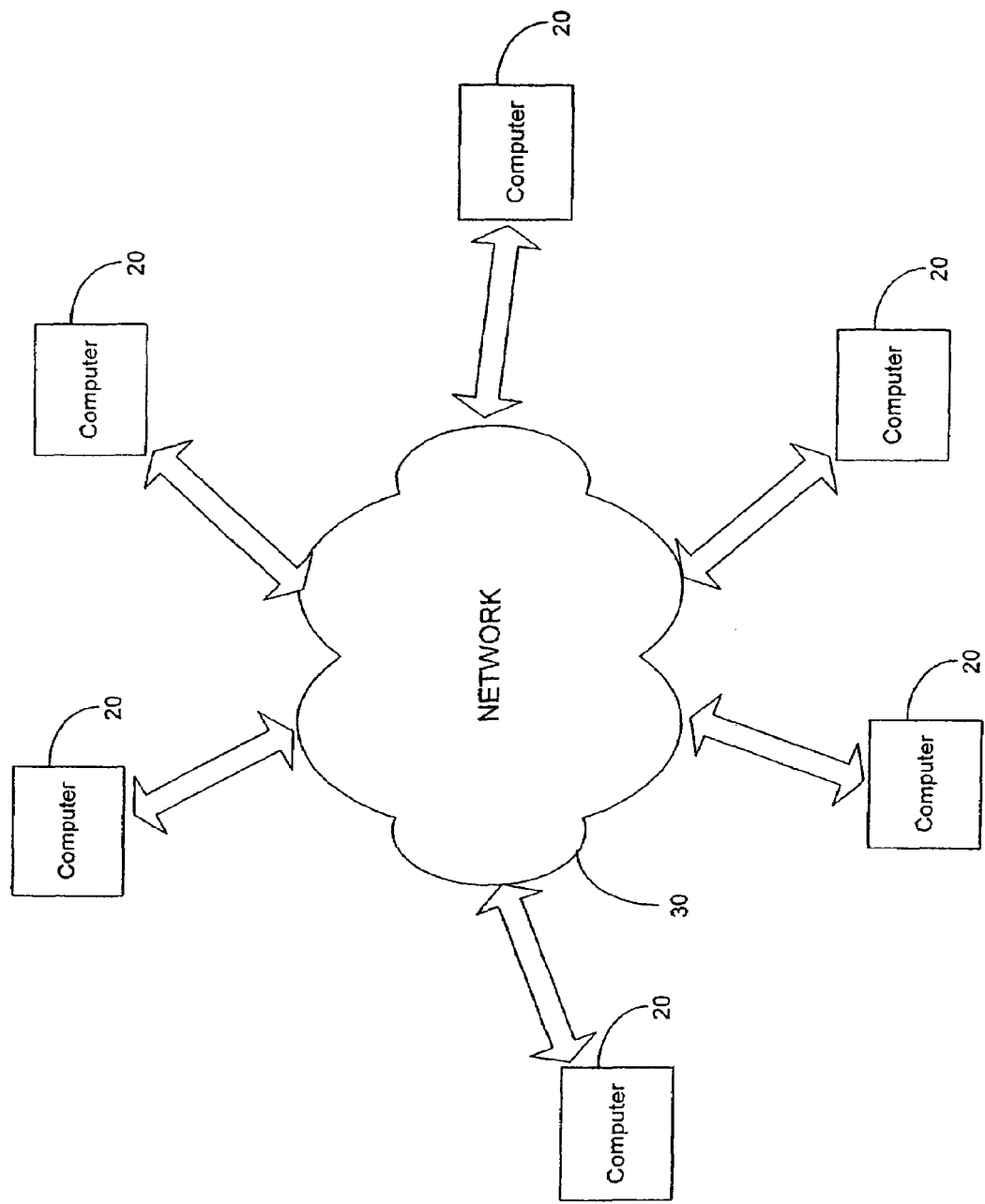
FIG. 1 is a schematic diagram of an exemplary computer network.

An example of a networked environment in which embodiments of the invention may be used will now be described with reference to FIG. 1. The example network includes several computing devices 20 communicating with one another over a network 30, such as the Internet, as represented in the figure by a cloud. Network 30 may include one or more well-known components, such as routers, gateways, hubs, etc. and may allow the computers 20 to communicate via wired and/or wireless media.

Figure 2:
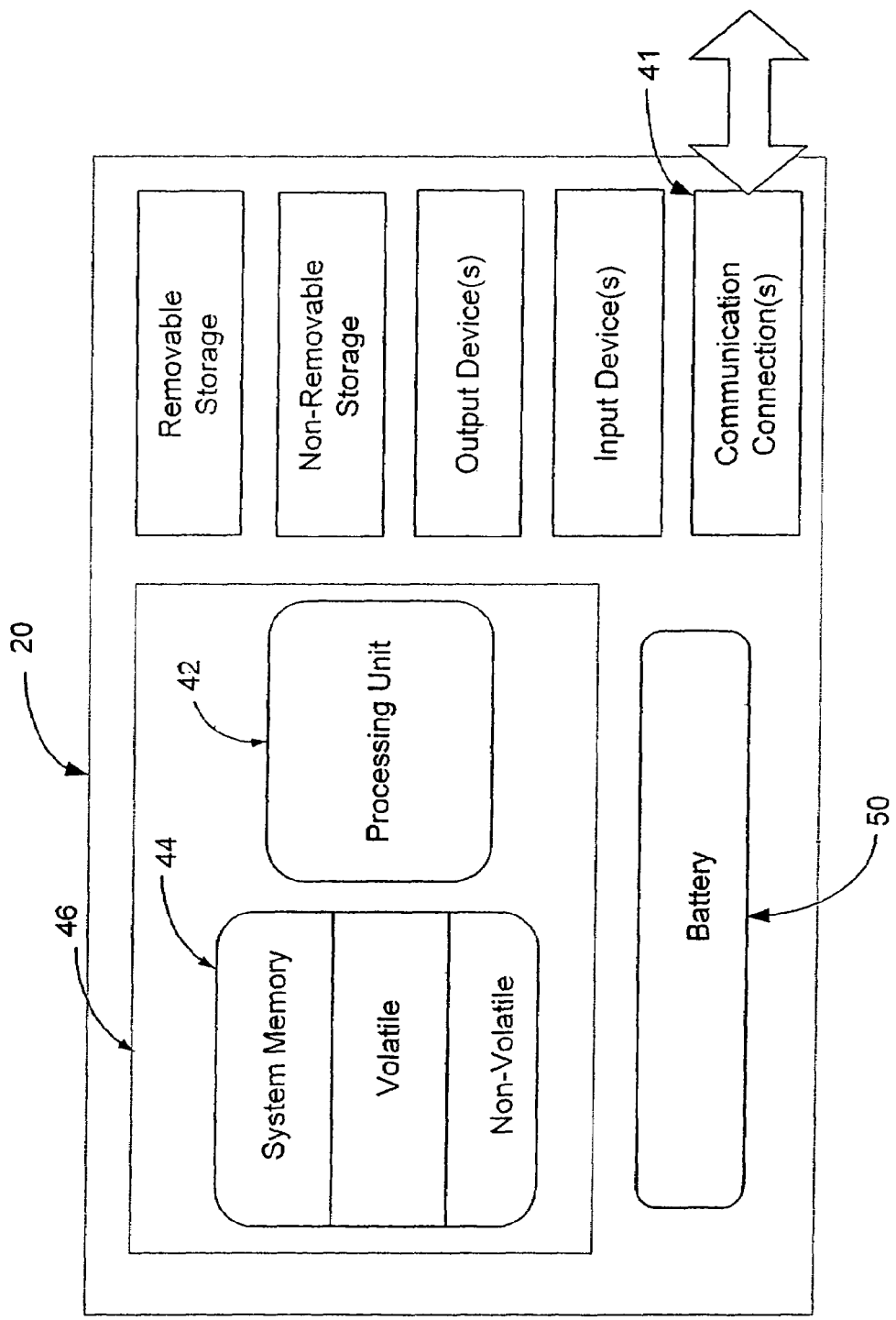
FIG. 2 is a schematic diagram illustrating the architecture of an exemplary computing device in which an embodiment of the invention may be implemented.

Referring to FIG. 2, an example of a basic configuration for a computing device on which the system described herein may be implemented is shown. In its most basic configuration, the computing device 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by line 46. Additionally, the computing device may also have other features/functionality. For example, computer 20 may also include additional storage (removable and/or non-removable) including, but not limited to, magnetic or optical disks or tape. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computing device 20. Any such computer storage media may be part of the computing device 20.

The computing device 20 preferably also contains communications connections 41 that allow the device to communicate with other devices. A communication connection is an example of a communication medium. Communication media typically embodies readable instructions, data structures, program modifies or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

The computing device 20 may also have input devices such as a keyboard, mouse, pen, voice input device, touch input device, etc. Output devices such as a display, speakers, a printer, etc. may also be included. For wireless mobile devices used in an implementation of an embodiment of the invention, the computing device 20 is provided with a portable power source 50, such as a battery pack, fuel cell or other power module. The power source 50 acts as a primary source of power for computations and wireless data transmissions to be performed by the device 20. When the device is described herein as "powered up," the device battery is used to render the computing device 20 in an "ON" state of operation. Conversely, when the device is described as being "powered down," the device is in an "OFF" state of operation, with little or no power being drawn by any component.

Figure 3:
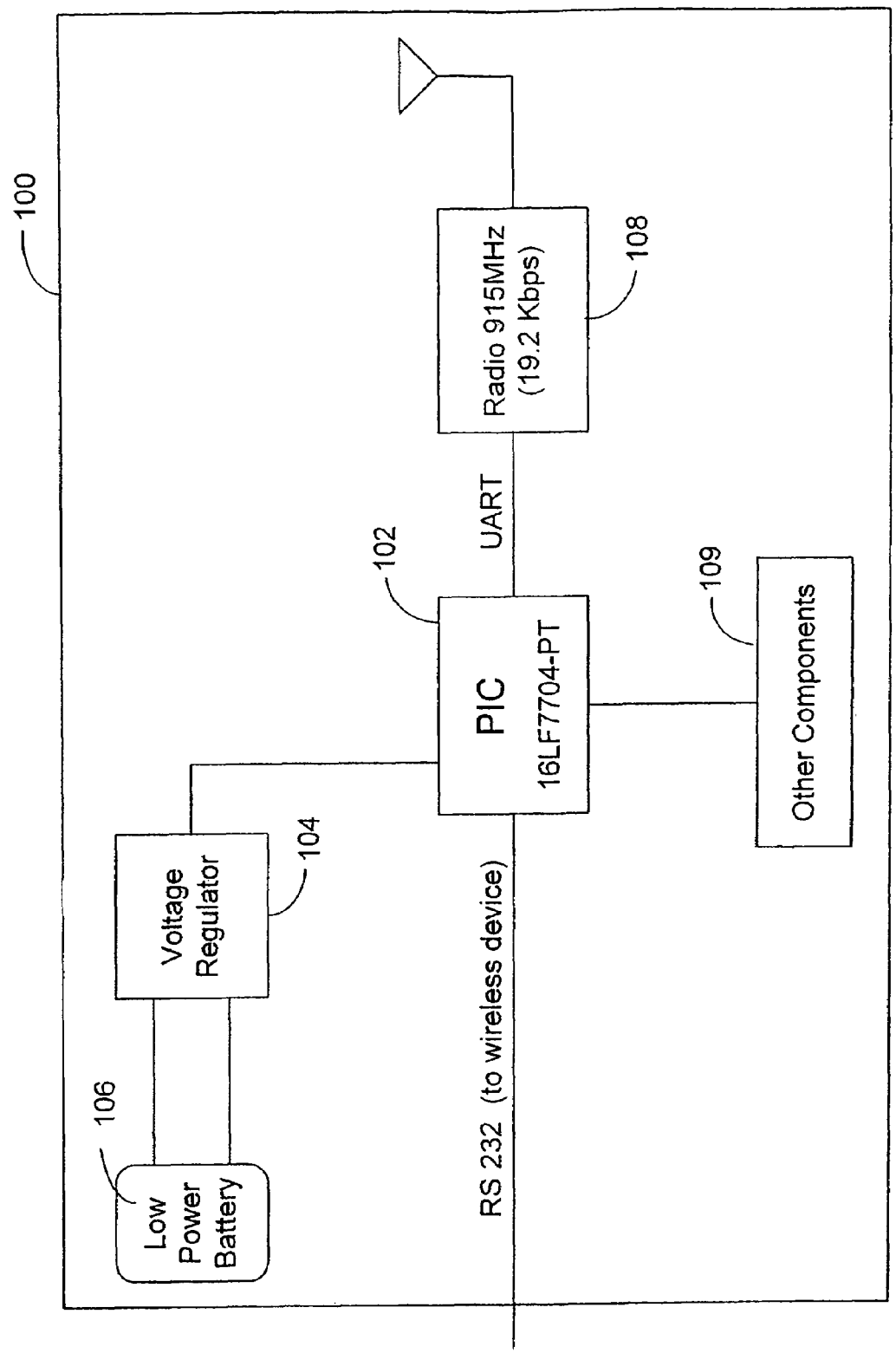
FIG. 3 is a schematic diagram illustrating the basic architecture of a transceiver component operated by the computing device of FIG. 2 for maintaining a low power control channel in an embodiment of the invention.

In accordance with an embodiment of the invention, the computing device 20 is further equipped with a low power transceiver component 100 for maintaining a RF control channel, as illustrated in greater detail in FIG. 3. The low power transceiver component, referred to as a minibrick 100, is comprised of various components for ensuring the receiving and sending of data, including a logic device 102 for controlling the operation of the transceiver and for powering up the computing device 20 in response to various network events. Also preferably included is a voltage regulator 104 for providing appropriate voltage from a low power battery unit 106. The low power battery unit 106 is suitable for powering the low power transceiver using minimal power, and preferably operates independently of the portable battery source 50. Alternatively, the primary battery source 50 may be used to power the low power transceiver. The low power transceiver 100 also includes a radio frequency (RF) generator 108 for emitting and generating radio frequency signals. Other elements 109 for implementing or enhancing the transceiver functions may also be included as part of the low power transceiver circuitry.

Physically, the low power transceiver 100 can be implemented as an internal component of the computing device 20, such as by integrating it with the primary motherboard of the computing device 20, or it can be connected to the computing device via a peripheral connection (e.g., the input channels 41). Also, the low power transceiver 100 is configured to support a control channel for receiving and sending data via the radio component 108. Exemplary operating characteristics for the low power transceiver 100 are shown in TABLE 1.

TABLE 1

Example operational characteristics for the low power transceiver 100.

| | |
|---|---|
| Data Rate | 19.2 Kbps |
| Modulation | 00 K |
| Voltage | 3 V |
| Receiver Current | 4.5 mA |
| Peak Radio Output Power | 0.75 mW |

As illustrated, the various characteristics of the low power transceiver 100 result in the generation of a low power, and preferably low frequency, data communication channel such as at 915 MHz, supporting a data rate of 19 Kbps or other acceptable rate, which is less than that of standard wireless NICs. Conventional NICs, such as those based on the IEEE 802.11 standard, operate at much higher data rates ranging approximately from 1-54 Mbps. Because of the higher data rates associated with standard NICs, the battery usage required for powering up the NIC is also higher. The low power transceiver 100, however, requires less power to operate, and is configured to remain active even during powered off states for the wireless computing device 20. While not limited to the operating characteristics of TABLE 1, the low power transceiver is suitable for generating and receiving RF signals without requiring significant power usage by the device.

Figure 4A:
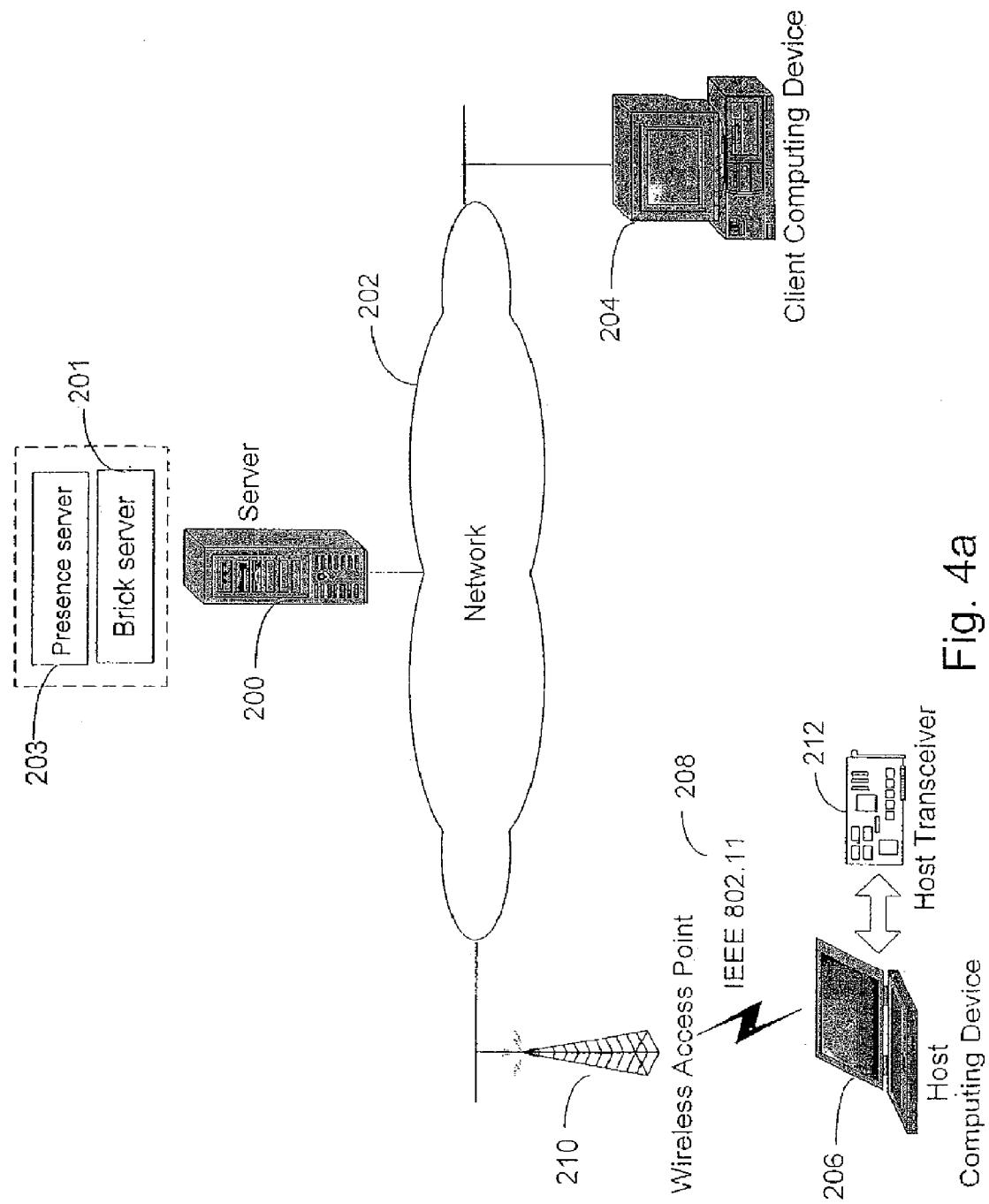
FIGS. 4a and 4b are schematic diagrams illustrating an exemplary operating environment for a wireless computing device to implement a low power control channel according to an embodiment of the invention.

Referring now to FIG. 4a, an exemplary network environment upon which a wireless computing device, such as the device of FIGS. 2-3, may operate is shown in accordance with an embodiment of the invention. The exemplary network includes a server 200, which interfaces with a computer network 202 and manages various network resources including a Brick Server 201 and a location and presence server 203. Both the Brick Server 201 and location and presence server 203 reside at the server 200 for facilitating specific network tasks.

In particular, the location and presence server (or presence server) maintains a list of clients that are registered with the network server 200 in order to have their presence and network location information maintained. "Presence" refers to any data received over the network that describes the network identity, availability, physical location, activity level and/or operating state of a computing device or corresponding user of a device. Essentially, any means by which the network server 200 can maintain a computing device's presence, or map a computing device to a particular network location is suitable for usage in the context of the invention.

Similar to the location and presence server 203, the Brick Server 201 maintains and manages presence information pertaining to one or more low power transceivers or host transceivers. The low power transceiver and host transceiver are low power RF components used to implement a low frequency band control channel within the network infrastructure. The operation of the host transceiver and low power transceiver will be described in greater detail in later sections of the detailed description.

In addition to maintaining network resources, the server 200 also facilitates communication for one or more computing devices that communicate over the network 202. A first client device 204 is configured to the network 202 through a wired connection (e.g., T1 line, modem), while the second client device, referred to herein as the host computing device, accesses the network via an access point. In particular, the host computing device 206 connects to the network 202 through a wireless connection 208 (e.g., 802.11 connection) or otherwise to a wireless access point 210. The access point 210 acts as an intermediate device between the host computing device 206 and the network infrastructure 202, to facilitate communication between the host computing device 206 and the server 200. Also integrated with the host computing device 206 is a host transceiver 212, which is a component that generates signals for communicating with low power transceiver 100. As described above, the host transceiver 212 is connected to the network 202 via the client device 206.

In an alternate embodiment of the invention, the host transceiver 212 can be integrated with the wireless access point 210 directly for communicating with the low power transceiver 100. In either ease, once the host transceiver is integrated with the access point 210 or with the host computing device 206 (either internally or externally), the host transceiver 212 is registered with the Brick Server 201 maintained by the server 200 in order to report its presence. The host transceiver, being connected to the network via a host computing device 206, as shown in the illustrated embodiment, may be able to detect various network events. This includes network events such as the transmission of a message to the host computing device 206 or access point, an update to any presence information maintained by the Brick Server 201, the transmission of messages intended for transmission by the access point 210, and any other statistics relative to the performance of the network 202.

Figure 4B:
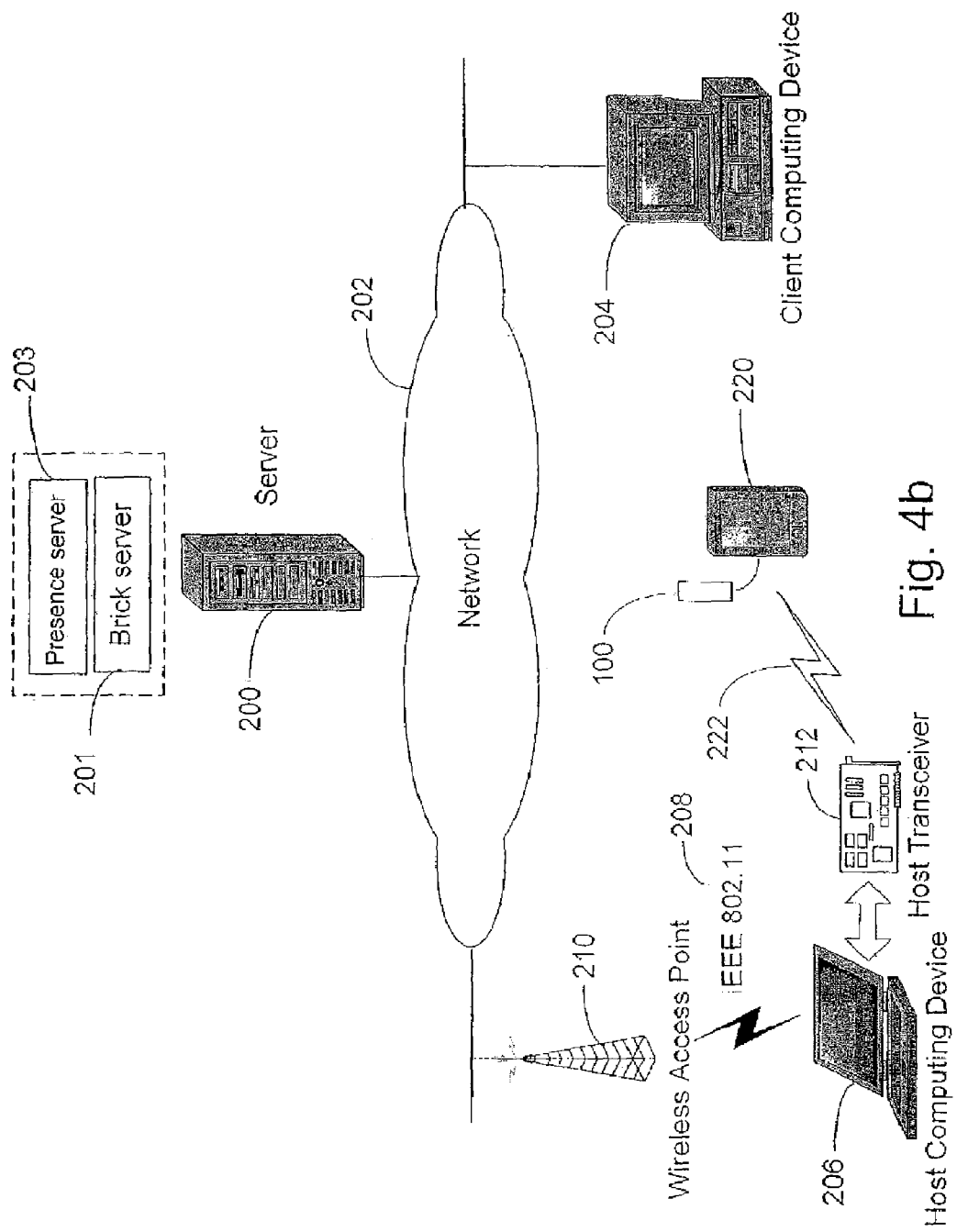

In accordance with an embodiment of the invention, a wireless computing device operating a low power transceiver 100 communicates with the host transceiver 212 via a low power control channel, as shown in FIG. 4b. The wireless computing device is a handheld device 220 having wireless computing capabilities. The low power transceiver 100 provides a low power, preferably low frequency band control channel. The low power transceiver 100 is enabled to remain powered up especially during inactive or idle periods for the wireless computing device 220 in which the device is predominantly powered off. Also, the low power transceiver 100 is capable of activating the wireless computing device 220 in response to "wake up" signals and other control signals.

To enable the low power transceiver 100 to engage in communication within the network 202 over a low power control channel, the low power transceiver 100 should first register with the Brick Server 201 maintained by the server 200. A user of the wireless computing device 220 can enable the registration process manually, such as by running a network application on the device 220 that engages the registration process. Alternatively, the registration process can be performed without user intervention through a simple communication scheme engaged in by the host transceiver 212 and low power transceiver 100, as described below.

To determine whether a low power transceiver requires registration, the host transceiver 212 periodically broadcasts beacon or detection signals indicating that the host transceiver is within a suitable range for engaging in communication via the low power control channel. This periodic detection signal is sent during times at which the host transceiver 212 is not transmitting other types of control signals or data. When the low power transceiver 100 operating at the wireless computing device 220 detects the host transceiver 212 detection signal, the low power transceiver 100 generates and sends a message to the host transceiver 212 indicating that it is in the vicinity of the host transceiver 212. Upon receiving this message, the host transceiver 212 makes a determination as to its capability to "manage" the low power transceiver 100, and then replies to the low power transceiver 100 with an acknowledgement message if appropriate. A response acknowledgement is then generated and sent to the host transceiver 212 by the low power transceiver 100, which results in an association (connection or link) between the two transceivers. Having established an association between the host transceiver 212 and low power transceiver 100, the host transceiver transmits a message to the presence server 203 to inform the server of the presence of the low power transceiver 100.

Regardless of the method of registration performed, be it as described above or by way of another technique, the wireless computing device 220 operating the low power transceiver 100 must be within a range suitable for receiving signals from and transmitting signals to the host transceiver 212. This range will vary based upon the specific design characteristics of the low power transceiver 100 and host transceiver 212. Note that the messages passed between the low power transceiver 100 and host transceiver 212 (e.g., acknowledgement messages) are transmitted over a low power, low bandwidth, communication channel, and not the primary communication channel of computing devices 206 and 220 that the host transceiver 212 and low power transceiver 100 reside upon respectively. Consequently, the high power NIC card of the wireless computing device 220 need not be used for facilitating the presence detection and registration process, resulting in less power usage by the device. Also, because the registration process is executed via a low power control channel rather than the high power wireless connection, the wireless computing device operating the low power transceiver 100 need not be powered up during the time.

Also, for reducing the power consumption of the wireless computing device 220, the low power control channel may be shut down during non-idle periods of operation by the wireless computing device 220. So, for example, when a NIC card is active at the computing device 220 for facilitating normal (high power) wireless communication such as pursuant to the 802.11 standard between the wireless computing device 220 and the network 202, the low power transceiver 100 can be powered down or placed into a nominal power mode (e.g., sleep mode of operation). Once the wireless computing device 220 becomes idle, the low power transceiver 100 can be powered up to resume its normal operation. In this way, there is no concurrent power usage by the wireless computing device in maintaining both the NIC and the low power transceiver in a powered up state in an embodiment.

Figure 5:
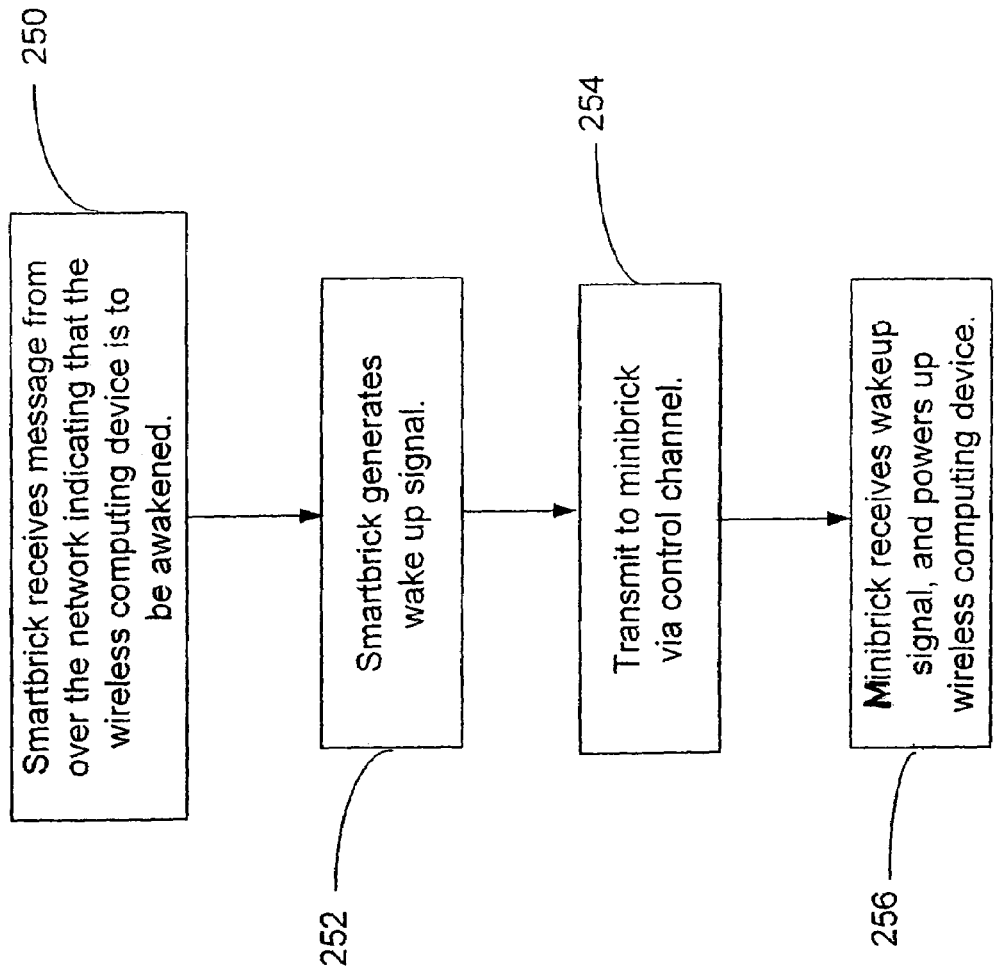
FIG. 5 is a flowchart illustrating the operation of a host transceiver for communicating with a wireless computing device via a low power control channel according to an embodiment of the invention.

The presence detection and registration process described above relates to the presence of the low power transceiver 100 and not expressly to the presence of the wireless computing device 220. However, those skilled in the art will recognize that detecting and registering the presence of a low power transceiver 100 provides an indication of the presence of the associated wireless computing device as well. An embodiment of the invention for controlling the power usage of the wireless computing device 220 operating a low power transceiver 100 will be described hereinafter with reference to FIG. 4b and the flowchart of FIG. 5.

Reducing Power Consumption of Low Power Transceiver Enabled Devices

In FIG. 4b, a control channel is shown to exist between the low power transceiver 100 of the wireless computing device 220 and the host transceiver 212, as represented by the bolted arrow 222. In this state, the host transceiver 212 is aware of the low power transceiver's 100 presence, and that the two are capable of exchanging data and control signals with one another. The control channel 222 remains active whether the wireless computing device 220 is predominantly powered off or on, or alternatively, can be powered down when the device is non-idle, i.e. predominantly powered on, as discussed above. In general, the computing device 200 is off when it is engaged in no activity over the network or when it is not in operation by the user. This operational state of the wireless computing device, wherein the device is significantly powered down or completely shut off due to lack of network or user activity is known to as an idle state.

A first client device 204 wishing to communicate with the wireless computing device 220 over the network 202 when the wireless computing device 220 is idle can do so by sending a wake up request to the host transceiver 212. Occasions on which a wake up request is sent to the host transceiver 212 by the first client device 204 may vary. For example, such a request can be sent to the host transceiver 212 in order to wake up the wireless computing device 220 prior to the transmission of a message by the first client device 204 to the wireless computing device 220 via a standard NIC connection between the access point 210 or host 206 and device 220. Waking up the wireless computing device 220 before the message is sent can avoid data transmission delay. When the first client device 204 wants to determine the presence of low power transceiver 100 in order to transmit a wakeup message, it queries the server 200 for this information. In response to this request, the server 200 sends the presence information maintained by the Brick Server 201 to the first client device 204. The presence information can include, but is not limited to, data such as the identity of the low power transceiver 100 and/or its associated device, its location, and the identity and location of the host computer 206 and host transceiver 212 that the low power transceiver 100 communicates with. After receiving this information, the first client device 204 sends a request to the host transceiver 212 via the host computer 206 requesting that the wireless computing device 220 be awakened. This occurrence corresponds to event 250 of the flowchart of FIG. 5.

When the host transceiver 212 receives the wake up request, it generates a corresponding wake up message to alert the low power transceiver 100 that it must power up the wireless computing device 220 (event 252). This message is then transmitted to the low power transceiver 100 over the low power control channel 222 in step 254. Upon receiving the wake up message, the low power transceiver 100 powers up the wireless computing device accordingly (event 256). This includes powering up the standard NIC of the device 220 to enable communication over the high data-rate, high-power network 202.

The communication between the host transceiver 212 and the low power transceiver 100 via the low power control channel 222 for controlling the power usage of the wireless computing device 220 has been discussed above. However, the ability of the host transceiver 212 and low power transceiver 100 to communicate by way of a low power control channel 222 requires that they be within radio range of one another. While the invention is not limited to any particular range, it is preferable that the low power transceiver of the wireless computing device 220 be close enough to a host transceiver enabled host computer 206 to ensure RF signal reception and data integrity. However, it is still possible to have such low power communications even when the relevant low power transceiver is not within direct communication range with the RF transceiver 212 operating at a host computer. Techniques for facilitating out-of-range communication are discussed in the following section of the detailed description.

Controlling Out-of-Range Low Power Transceivers

Figure 6A:
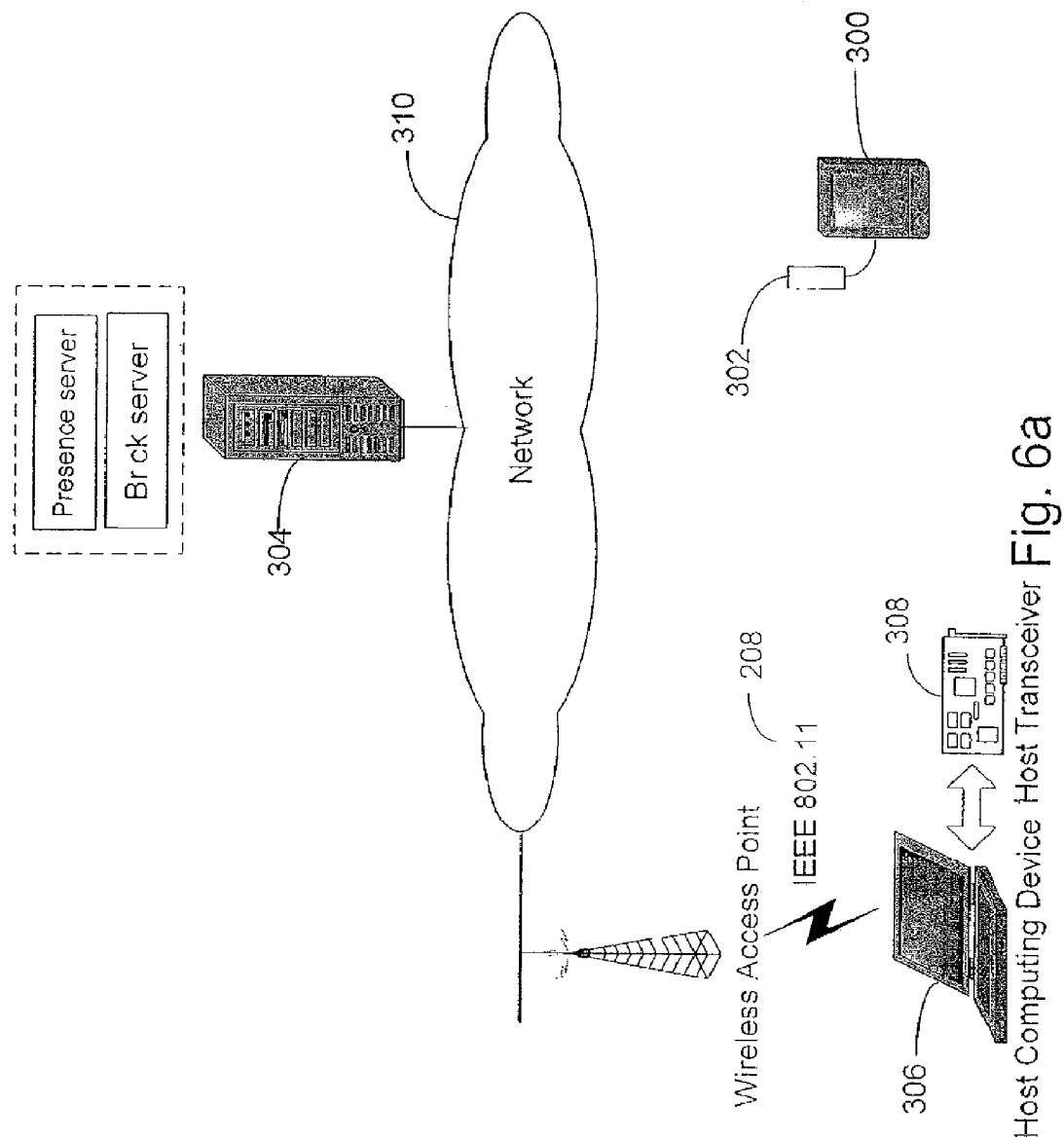
FIGS. 6a and 6b are diagrams illustrating an embodiment of the invention for facilitating communication between two computing devices.
Figure 6B:
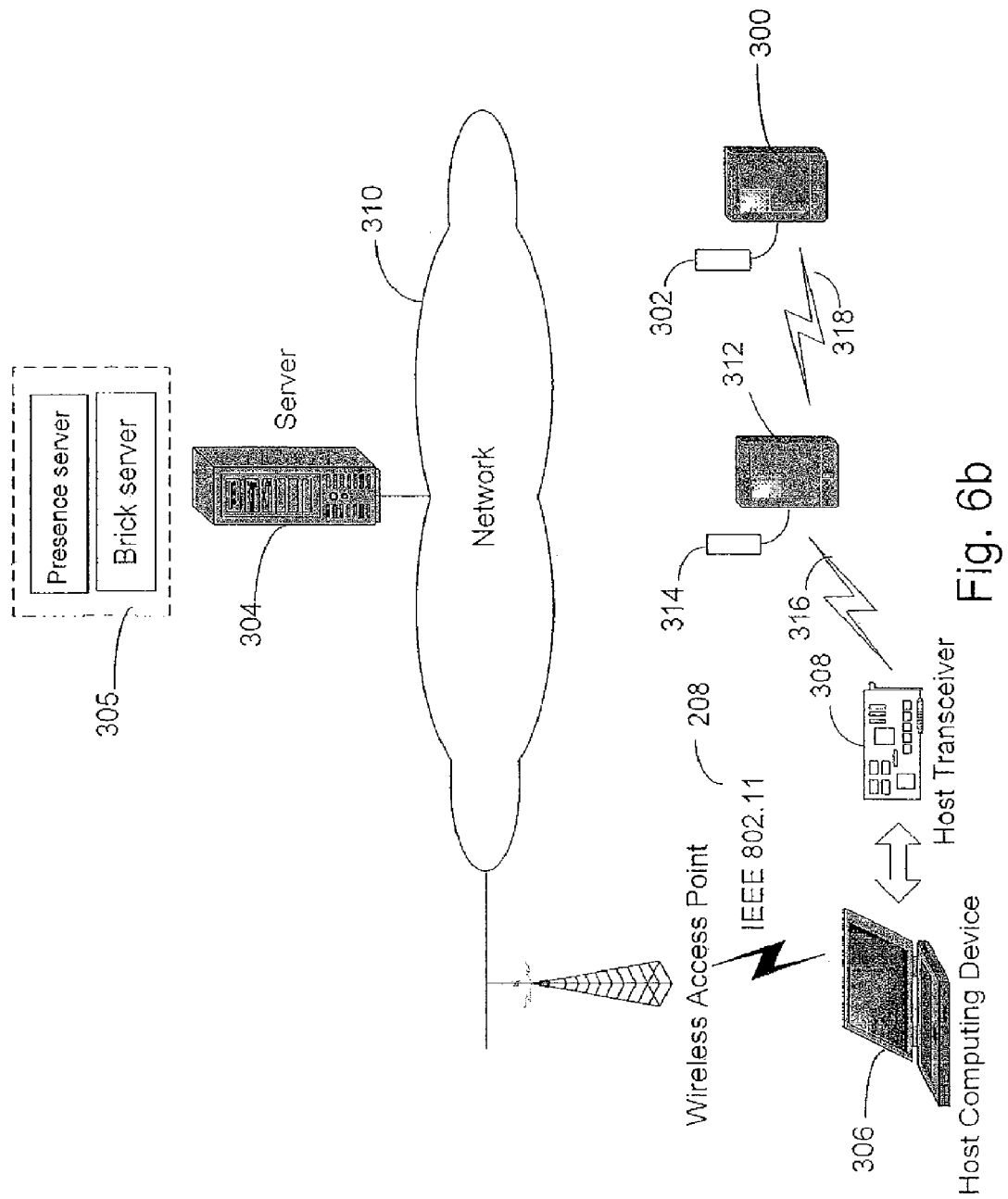
Figure 7:
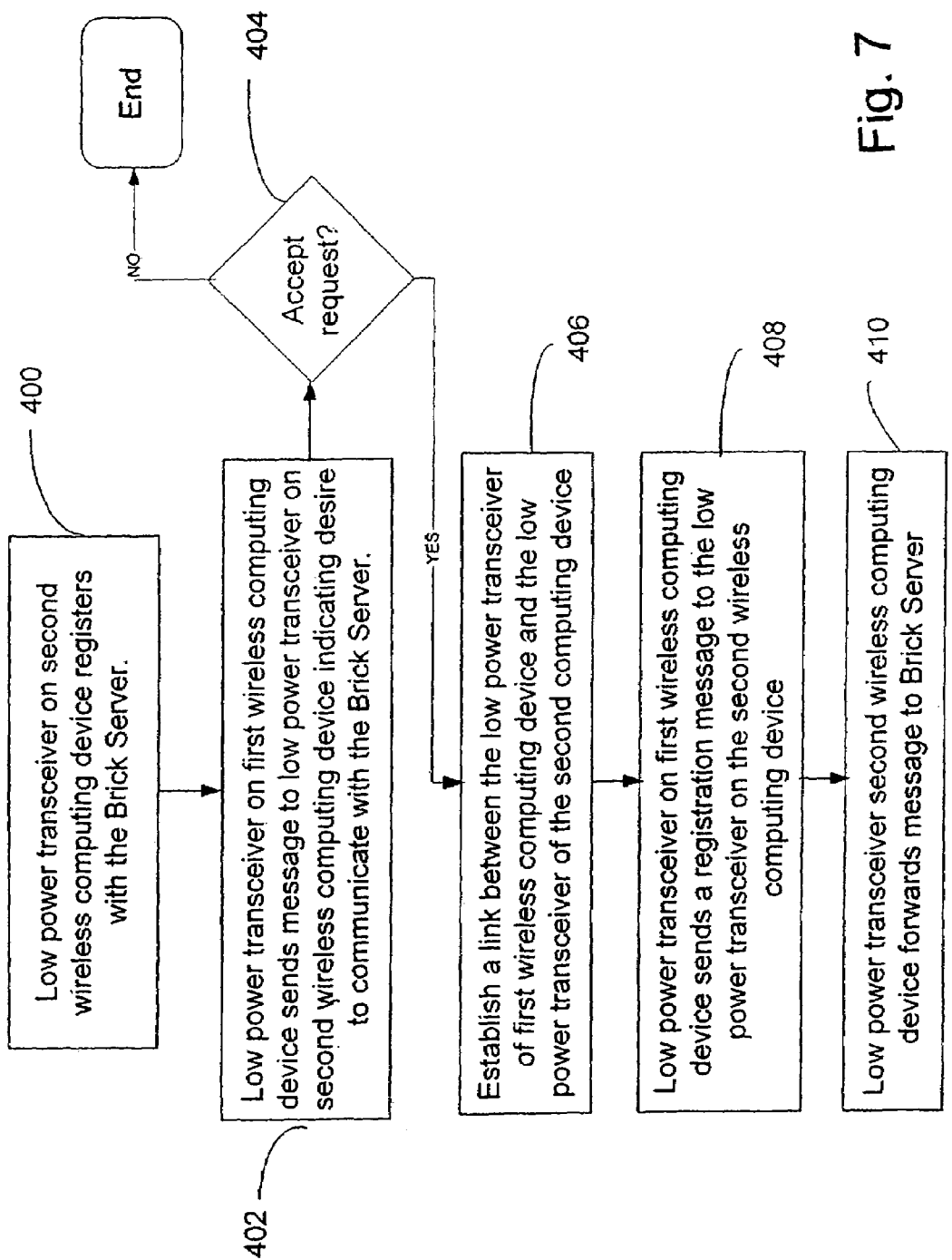
FIG. 7 is a flowchart illustrating the operation of a low power transceiver for communicating with another low power transceiver in order to access a network according to an embodiment of the invention.

In FIG. 6a, a first wireless computing device 300 operating a low power transceiver 302 is shown to be out of a suitable direct range for supporting communication with a host computer 306 operating a host transceiver 308. As such, the low power transceiver 302 is unable to register with the server 304 to enable its presence information to be conveyed with other devices over the network 310, as described earlier. In accordance with an embodiment of the invention, however, the first wireless computing device 300 is able to communicate with the server 304 using multi-hop networking, as illustrated in FIG. 6b and the corresponding flowchart of FIG. 7. Specifically, when a second wireless computing device 312 operating a low power transceiver device 314 is within range of the host computer 306 operating the host transceiver 308, the device 312 is registered with the Brick Server 305 (event 400 of FIG. 7). Subsequently, a low power control channel 316 is established between the second computing device 312 and host transceiver enabled device 306.

When the second wireless computing device 306 is also within range of the first wireless computing device 300, the low power transceiver operating on the first wireless computing device 300 establishes contact with the second wireless computing device 312 via a low power communication channel. In particular, the low power transceiver 302 of the first wireless computing device 300 sends a message to the low power transceiver 314 of the second wireless computing device 312 requesting that it be allowed to access the Brick Server 305 (event 402). The low power transceiver of the second wireless computing device 312 then makes a determination as to whether to acknowledge and accept this request (event 404). If the request is accepted, a control channel 318 is established between the first and second wireless computing devices 300, and 312 (event 406). The low power transceiver 302 associated with the first wireless computing device 300 sends a registration message to the second wireless computing device 312 (event 408). This message is then forwarded by the second wireless computing device 312 to the host transceiver 308 operating upon the host computer 306, and to the Brick Server 305 (event 410). Once the registration of the low power transceiver 302 for the first wireless computing device 300 is recorded by the server 304, the first wireless computing device 300 is able to engage in communication with other devices over the network 310.

Those skilled in the art will recognize that the above described processes can be carried out within an environment of several wireless computing devices and not just between two. As will be appreciated by those skilled in the art, whenever a number of wireless computing devices are within an appropriate low power radio range of one another, multi-hop communication can ideally be engaged by an unlimited number of such devices. This is particularly advantageous in the case of mobile wireless computing devices, such as Pocket-PCs, wherein a direct connection to a host transceiver enabled host 306 may be limited as the device user roams from one location to another. By connecting to the server via another low power transceiver enabled device, the low power control channel can still be activated for facilitating reduction of power consumption of a device.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method for communicating with a wireless computing device over a network comprising a secondary communication channel, the secondary communication channel being a radio frequency channel operable by the wireless computing device and requiring less power usage by the wireless computing device than a two-way primary communication channel also operable by the wireless computing device, the method comprising:

requesting, by a requesting device, a notification of the presence of a low power transceiver operating upon the wireless computing device;

receiving, by the requesting device, a notification of the presence of a low power transceiver operating upon the wireless computing device;

sending, by the requesting device, a wakeup request, via the secondary communication channel, requesting activation of the wireless computing device from a low power state, in which the wireless computing device does not communicate over the two-way primary communication channel, to a high power state, in which the wireless computing device communicates over the primary communication channel; and communicating, by the requesting device, with the wireless computing device over the two-way primary communication channel, after sending the wakeup request.

2. The method of claim 1 wherein requesting a notification of the presence of a low power transceiver operating upon the wireless computing device further comprises determining whether the wireless computing device is within radio range over the secondary communication channel of a host transceiver via the low power transceiver.

3. The method of claim 2 wherein the host transceiver is operable by a host computer and is communicably linked with the requesting device.

4. The method of claim 2 wherein determining whether the wireless computing device is within radio range over the secondary communication channel of a host transceiver via the low power transceiver further comprises broadcasting a detection signal via the secondary communication channel.

5. The method of claim 4 wherein the detection signal is transmitted when the host transceiver is not transmitting other types of signals via the secondary communication channel.

6. The method of claim 1 wherein requesting a notification of the presence of a low power transceiver operating upon the wireless computing device further comprises transmitting a message to a presence server, the message indicating the presence of the low power transceiver.

7. The method of claim 1 wherein requesting a notification of the presence of a low power transceiver operating upon the wireless computing device further comprises querying the presence server for presence information pertaining to the low power transceiver.

8. A system for communicating with a wireless computing device over a network via a secondary communication channel, the secondary communication channel being a radio frequency channel operable by the wireless computing device and requiring less power usage by the wireless computing device than a two-way primary communication channel also operable by the wireless computing device, the system comprising:

means for detecting the presence of a low power transceiver operating upon the wireless computing device via the secondary communication channel; and means for transmitting a message to the wireless computing device via the secondary communication channel based on the presence of the low power transceiver, the message requesting activation of the wireless computing device from a low power state, in which the wireless computing device does not communicate over the primary communication channel, to a high power state, in which the wireless computing device communicates over the two-way primary communication channel, whereby in response to the message a reply message is transmitted to the wireless computing device via the two-way primary communication channel.

9. The system of claim 8 wherein said means for transmitting a message comprises communication facilities of a computing device remote from the wireless computing device, and wherein said means for detecting is operable by a host computer that is communicably linked with a requesting device.

10. The system of claim 9 wherein the host computer comprises means for broadcasting a detection signal via the secondary communication channel, the detection signal indicating whether the wireless computing device is within a physical range suitable for enabling said means for detecting to communicate with the wireless computing device via the secondary communication channel.

11. The system of claim 8 wherein said means for detecting further comprises means for maintaining presence information associated with one or more radio transceivers operable by one or more wireless computing devices capable of communicating via the secondary communication channel.

12. The system of claim 8 wherein said means for transmitting is communicably linked with a host computer via the primary communication channel.

13. The system of claim 12 wherein the host computer comprises means for generating a corresponding message in response to a message received from said means for transmitting, the corresponding message indicating a request for the wireless computing device to perform an action, the corresponding message being transmitted to the wireless computing device via the secondary communication channel.

* * * * *